(12) United States Patent
Lee et al.

(10) Patent No.: US 8,905,889 B2
(45) Date of Patent: Dec. 9, 2014

(54) PLANETARY GEAR TRAIN OF AUTOMATIC TRANSMISSION FOR VEHICLE

(71) Applicant: Hyundai Motor Company, Seoul (KR)

(72) Inventors: Chang Wook Lee, Suwon-si (KR);
Kangsoo Seo, Yongin-si (KR); Jae Chang Kook, Hwaseong-si (KR);
Jongsool Park, Hwaseong-si (KR);
Myonghoon Noh, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/084,237

(22) Filed: Nov. 19, 2013

(65) Prior Publication Data
US 2014/0148298 A1  May 29, 2014

(30) Foreign Application Priority Data
Nov. 28, 2012  (KR) .......................... 10-2012-0136462

(51) Int. Cl.
*F16H 3/44* (2006.01)
*F16H 3/66* (2006.01)

(52) U.S. Cl.
CPC .................. *F16H 3/66* (2013.01); *F16H 3/666* (2013.01); *F16H 2200/006* (2013.01); *F16H 2200/0086* (2013.01); *F16H 2200/2007* (2013.01); *F16H 2200/2046* (2013.01)
USPC .......................................... 475/271; 475/282

(58) Field of Classification Search
USPC .................................. 475/271, 282, 284, 323
See application file for complete search history.

(56) References Cited

U.S. PATENT DOCUMENTS

| 8,083,633 | B2 | 12/2011 | Wittkopp et al. |
| 8,226,512 | B2 | 7/2012 | Wittkopp et al. |
| 8,414,442 | B2 * | 4/2013 | Seo et al. ................. 475/218 |

FOREIGN PATENT DOCUMENTS

JP           2998941 B2    11/1999

\* cited by examiner

*Primary Examiner* — Robert A Siconolfi
*Assistant Examiner* — Huan Le
(74) *Attorney, Agent, or Firm* — Morgan, Lewis & Bockius LLP (57) ABSTRACT

A planetary gear train of an automatic transmission may include: a first shaft receiving engine torque; a second parallel shaft; a first planetary gear set on the first shaft including a first element engaging the first shaft and a transmission housing, a second element engaging the first shaft and the transmission housing, and a third output element; a second planetary gear set on the second shaft, and including a fourth element engaging the first element, a fifth element connected to the third element and directly connected to an output gear, and a sixth element connected to the first shaft and engaging the first element; three transfer gears; and frictional elements including four clutches connecting the first and second elements to the first shaft and connecting the first element to the fourth and sixth elements, and two brakes connecting the first and second elements to the transmission housing.

6 Claims, 6 Drawing Sheets

FIG.2

|  | C1 | C2 | C3 | C4 | B1 | B2 |
|---|---|---|---|---|---|---|
| 1ST | ● |  |  |  | ● |  |
| 2ND | ● |  |  |  |  | ● |
| 3RD | ● | ● |  |  |  |  |
| 4TH | ● |  | ● |  |  |  |
| 5TH | ● |  |  | ● |  |  |
| 6TH |  |  | ● | ● |  |  |
| 7TH |  | ● |  | ● |  |  |
| 8TH |  |  |  | ● |  | ● |
| REV1 |  | ● |  |  | ● |  |
| REV2 |  |  | ● |  | ● |  |

FIG.5

# PLANETARY GEAR TRAIN OF AUTOMATIC TRANSMISSION FOR VEHICLE

CROSS-REFERENCE TO RELATED APPLICATION

The present application claims priority of Korean Patent Application Number 10-2012-0136462 filed Nov. 28, 2012, the entire contents of which application is incorporated herein for all purposes by this reference.

BACKGROUND OF INVENTION

1. Field of Invention

The present invention relates to an automatic transmission for a vehicle. More particularly, the present invention relates to a planetary gear train of an automatic transmission for a vehicle that can improve mountability and power delivery performance and reduce fuel consumption.

2. Description of Related Art

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a planetary gear train of an automatic transmission for a vehicle having advantages of improving mountability by shortening a length thereof and reducing the number of components as a consequence of achieving eight forward speeds and two reverse speeds by disposing two planetary gear sets separately on a first shaft and a second shaft disposed in parallel and connecting rotation elements of the planetary gear sets through a plurality of externally-meshed gears.

In addition, the present invention has been made in an effort to provide a planetary gear train of an automatic transmission for a vehicle having further advantages of enabling of setting optimum gear ratios due to ease of changing gear ratios by using a plurality of externally-meshed gears, and accordingly improving power delivery performance and fuel economy.

A planetary gear train of an automatic transmission for a vehicle according to one aspect of the present invention may include: a first shaft receiving torque of an engine; a second shaft disposed in parallel with the first shaft with a predetermined distance; a first planetary gear set disposed on the first shaft, and including a first rotation element selectively connected to the first shaft and selectively connected to a transmission housing, a second rotation element selectively connected to the first shaft and selectively connected to the transmission housing, and a third rotation element operated as an output element; a second planetary gear set disposed on the second shaft, and including a fourth rotation element selectively connected to the first rotation element through an externally-meshed gear, a fifth rotation element connected to the third rotation element through an externally-meshed gear and directly connected to an output gear, and a sixth rotation element connected to the first shaft through an externally-meshed gear and selectively connected to the first rotation element through an externally-meshed gear; three transfer gears connecting the fourth, fifth, and sixth rotation elements to the first and third rotation elements and connecting the sixth rotation element to the first shaft; and frictional elements including four clutches selectively connecting the first and second rotation elements to the first shaft and selectively connecting the first rotation element to the fourth and sixth rotation elements, and two brakes selectively connecting the first and second rotation elements to the transmission housing.

The first planetary gear set may be a single pinion planetary gear set including a first sun gear being the first rotation element, a first planet carrier being the second rotation element, and a first ring gear being the third rotation element, and the second planetary gear set may be a single pinion planetary gear set including a second sun gear being the fourth rotation element, a second planet carrier being the fifth rotation element, and a second ring gear being the sixth rotation element.

The three transfer gears may include: a first transfer gear connecting the first shaft to the sixth rotation element; a second transfer gear connecting the first rotation element to the fourth rotation element and the sixth rotation element; and a third transfer gear connecting the third rotation element to the fifth rotation element.

The frictional elements may include: a first clutch disposed between the second transfer gear and the fourth rotation element; a second clutch disposed between the second transfer gear and the sixth rotation element; a third clutch disposed between the first shaft and the first rotation element; a fourth clutch disposed between the first shaft and the second rotation element; a first brake disposed between the second rotation element and the transmission housing; and a second brake disposed between the first rotation element and the transmission housing.

The first clutch and the first brake may be operated at a first forward speed, the first clutch and the second brake may be operated at a second forward speed, the first clutch and the second clutch may be operated at a third forward speed, the first clutch and the third clutch may be operated at a fourth forward speed, the first clutch and the fourth clutch may be operated at a fifth forward speed, the third clutch and the fourth clutch may be operated at a sixth forward speed, the second clutch and the fourth clutch may be operated at a seventh forward speed, the fourth clutch and the second brake may be operated at an eighth forward speed, the second clutch and the first brake may be operated at a first reverse speed, and the third clutch and the first brake may be operated at a second reverse speed.

The frictional elements may include: a first clutch disposed between the second transfer gear and the fourth rotation element; a second clutch disposed between the second transfer gear and the sixth rotation element; a third clutch disposed between the first shaft and the first rotation element; a fourth clutch disposed between the first shaft and the second rotation element; a first brake disposed between the second rotation element and the transmission housing; and a second brake disposed between the second transfer gear and the transmission housing.

The first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

The first planetary gear set may be a single pinion planetary gear set including a first sun gear being the first rotation element, a first planet carrier being the second rotation element, and a first ring gear being the third rotation element, and the second planetary gear set may be a double pinion planetary gear set including a second sun gear being the fourth rotation element, a second ring gear being the fifth rotation element, and a second planet carrier being the sixth rotation element.

A planetary gear train of an automatic transmission for a vehicle according to another aspect of the present invention may include: a first shaft receiving torque of an engine; a second shaft disposed in parallel with the first shaft with a predetermined distance; a first planetary gear set disposed on the first shaft, and including a first rotation element selectively connected to the first shaft and a transmission housing, a second rotation element selectively connected to the first shaft and the transmission housing, and a third rotation element; a second planetary gear set disposed on the second shaft, and including a fourth rotation element selectively connected to the first rotation element, a fifth rotation element connected to the third rotation element and directly connected to an output gear, and a sixth rotation element connected to the first shaft and selectively connected to the first rotation element; a first transfer gear connecting the first shaft to the sixth rotation element; a second transfer gear connecting the first rotation element to the fourth rotation element and the sixth rotation element; a third transfer gear connecting the third rotation element to the fifth rotation element; and frictional elements including clutches selectively connecting the first and second rotation elements to the first shaft and selectively connecting the first rotation element to the fourth and sixth rotation elements, and brakes selectively connecting the first and second rotation elements to the transmission housing.

The first planetary gear set may be a single pinion planetary gear set including a first sun gear being the first rotation element, a first planet carrier being the second rotation element, and a first ring gear being the third rotation element, and the second planetary gear set may be a single pinion planetary gear set including a second sun gear being the fourth rotation element, a second planet carrier being the fifth rotation element, and a second ring gear being the sixth rotation element.

The frictional elements may include: a first clutch disposed between the second transfer gear and the fourth rotation element; a second clutch disposed between the second transfer gear and the sixth rotation element; a third clutch disposed between the first shaft and the first rotation element; a fourth clutch disposed between the first shaft and the second rotation element; a first brake disposed between the second rotation element and the transmission housing; and a second brake disposed between the first rotation element and the transmission housing.

The frictional elements may include: a first clutch disposed between the second transfer gear and the fourth rotation element; a second clutch disposed between the second transfer gear and the sixth rotation element; a third clutch disposed between the first shaft and the first rotation element; a fourth clutch disposed between the first shaft and the second rotation element; a first brake disposed between the second rotation element and the transmission housing; and a second brake disposed between the second transfer gear and the transmission housing.

The first planetary gear set may be a double pinion planetary gear set including a first sun gear being the first rotation element, a first ring gear being the second rotation element, and a first planet carrier being the third rotation element, and the second planetary gear set may be a single pinion planetary gear set including a second sun gear being the fourth rotation element, a second planet carrier being the fifth rotation element, and a second ring gear being the sixth rotation element.

The first planetary gear set may be a single pinion planetary gear set including a first sun gear being the first rotation element, a first planet carrier being the second rotation element, and a first ring gear being the third rotation element, and the second planetary gear set may be a double pinion planetary gear set including a second sun gear being the fourth rotation element, a second ring gear being the fifth rotation element, and a second planet carrier being the sixth rotation element.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the illustrated exemplary embodiments will be omitted, and the same constituent elements are denoted by the same reference numerals in this specification.

In the detailed description, ordinal numbers are used for distinguishing constituent elements having the same terms, and have no specific meanings.

Figure 1:
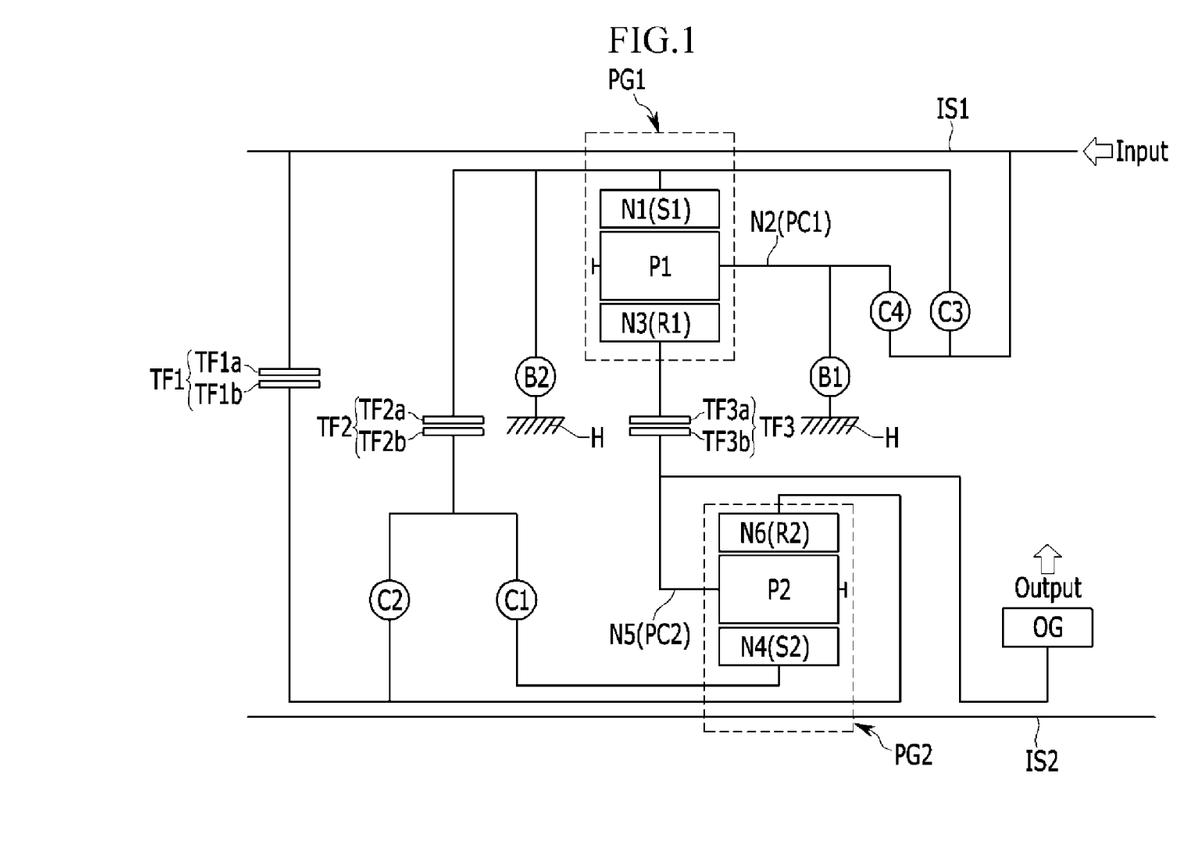
FIG. 1 is a schematic diagram of an exemplary planetary gear train according to the present invention.

FIG. 1 is a schematic diagram of a planetary gear train according to various embodiments of the present invention.

Referring to FIG. 1, a planetary gear train may include a first planetary gear set PG1 disposed on a first shaft IS1, a second planetary gear set PG2 disposed on a second shaft IS2 disposed in parallel with the first shaft IS1, three transfer gears TF1, TF2, and TF3, and frictional elements consisting of four clutches C1, C2, C3, and C4 and two brakes B1 and B2.

Therefore, torque input from the first shaft IS1 is converted into eight forward speeds and two reverse speeds by cooperation of the first and second planetary gear sets PG1 and PG2, and then is output through an output gear OG.

The first shaft IS1 is an input member, and torque from a crankshaft of the engine is changed through a torque converter and is input to the first shaft IS1.

The second shaft IS2 supports the second planetary gear set PG2 without rotational interference therebetween.

The first planetary gear set PG1 is a single pinion planetary gear set, and includes a first sun gear S1 being a first rotation element N1, a first planet carrier PC1 rotatably supporting a first pinion P1 externally meshed with the first sun gear S1 and being a second rotation element N2, and a first ring gear R1 internally meshed with the first pinion P1 and being a third rotation element N3.

The second planetary gear set PG2 is a single pinion planetary gear set, and includes a second sun gear S2 being a fourth rotation element N4, a second planet carrier PC2 rotatably supporting a second pinion P2 externally meshed with the second sun gear S2 and being a fifth rotation element N5, and a second ring gear R2 internally meshed with the second pinion P2 and being a sixth rotation element N6.

The first and second rotation elements N1 and N2 of the first planetary gear set PG1 are selectively connected to the first shaft IS1, the fourth rotation element N2 of the second planetary gear set PG2 is selectively connected to the first rotation element N1 through two paths respectively having externally-meshed gears, the fifth rotation element N5 of the second planetary gear set PG2 is directly connected to the third rotation element N3 of the first planetary gear set PG1 through an externally-meshed gear and is directly connected to the output gear OG, and the sixth rotation element N6 of the second planetary gear set PG2 is directly connected to the first shaft IS1 through an externally-meshed gear and is selectively connected to the first rotation element N1 through an externally-meshed gear.

The output gear OG drives a drive shaft including a driving wheel through a final reduction gear and a differential apparatus.

The first, second, and third transfer gears TF1, TF2, and TF3 respectively have first, second, and third transfer drive gears TF1$a$, TF2$a$, and TF3$a$ and first, second, and third transfer driven gears TF1$b$, TF2$b$, and TF3$b$ externally meshed with each other.

The first transfer gear TF1 connects the first shaft IS1 to the sixth rotation element N6.

The second transfer gear TF2 connects the first rotation element N1 to the fourth rotation element N4 and the sixth rotation element N6.

The third transfer gear TF3 connects the third rotation element N3 to the fifth rotation element N5.

Therefore, the rotation elements (including the first shaft IS1) connected with each other through the first, second, and third transfer gears TF1, TF2, and TF3 are rotated in opposite direction to each other according to gear ratios of the first, second, and third transfer gears TF1, TF2, and TF3.

In addition, four clutches C1, C2, C3, and C4 selectively connecting the selected rotation elements (including the first shaft IS1) and two brakes B1 and B2 selectively connecting the selected rotation elements to the transmission housing H are disposed as follows.

The first clutch C1 is disposed between the second transfer gear TF2 and the fourth rotation element N4.

The second clutch C2 is disposed between the second transfer gear TF2 and the sixth rotation element N6.

The third clutch C3 is disposed between the first shaft IS1 and the first rotation element N1.

The fourth clutch C4 is disposed between the first shaft IS1 and the second rotation element N2.

The first brake B1 is disposed between the second rotation element N1 and the transmission housing H.

The second brake B2 is disposed between the first rotation element N1 and the transmission housing H.

The frictional elements consisting of the first, second, third, and fourth clutches C1, C2, C3, and C4 and the first and second brakes B1 and B2 are conventional multi-plate friction elements of wet type that are operated by hydraulic pressure.

Figure 2:
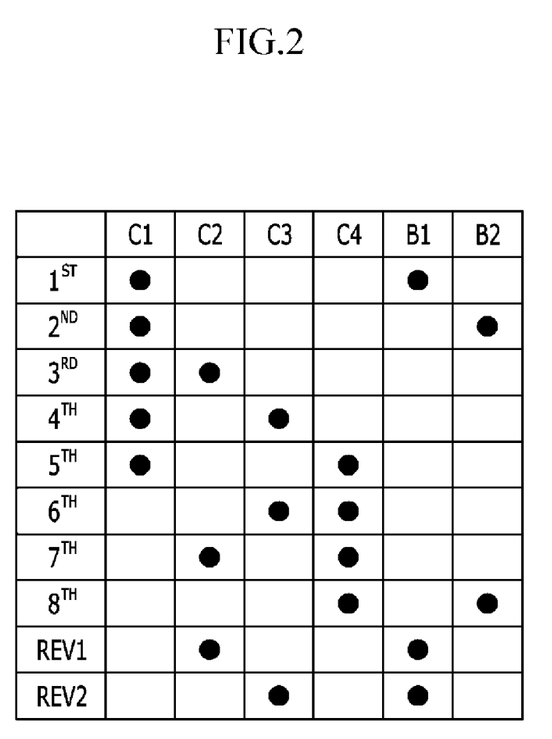
FIG. 2 is an operational chart of friction elements at each shift-speed applied to a planetary gear train according to the planetary gear train of FIG. 1.

FIG. 2 is an operational chart of friction elements at each shift-speed applied to the planetary gear train of FIG. 1.

As shown in FIG. 2, two frictional elements are operated at each shift-speed in the planetary gear train of FIG. 1.

The first clutch C1 and the first brake B1 are operated at a first forward speed $1^{ST}$.

The first clutch C1 and the second brake B2 are operated at a second forward speed $2^{ND}$.

The first clutch C1 and the second clutch C2 are operated at a third forward speed $3^{RD}$.

The first clutch C1 and the third clutch C3 are operated at a fourth forward speed $4^{TH}$.

The first clutch C1 and the fourth clutch C4 are operated at a fifth forward speed $5^{TH}$.

The third clutch C3 and the fourth clutch C4 are operated at a sixth forward speed $6^{TH}$.

The second clutch C2 and the fourth clutch C4 are operated at a seventh forward speed $7^{TH}$.

The fourth clutch C4 and the second brake B2 are operated at an eighth forward speed $8^{TH}$.

The second clutch C2 and the first brake B1 are operated at a first reverse speed REV1.

The third clutch C3 and the first brake B1 are operated at a second reverse speed REV2.

Figure 3:
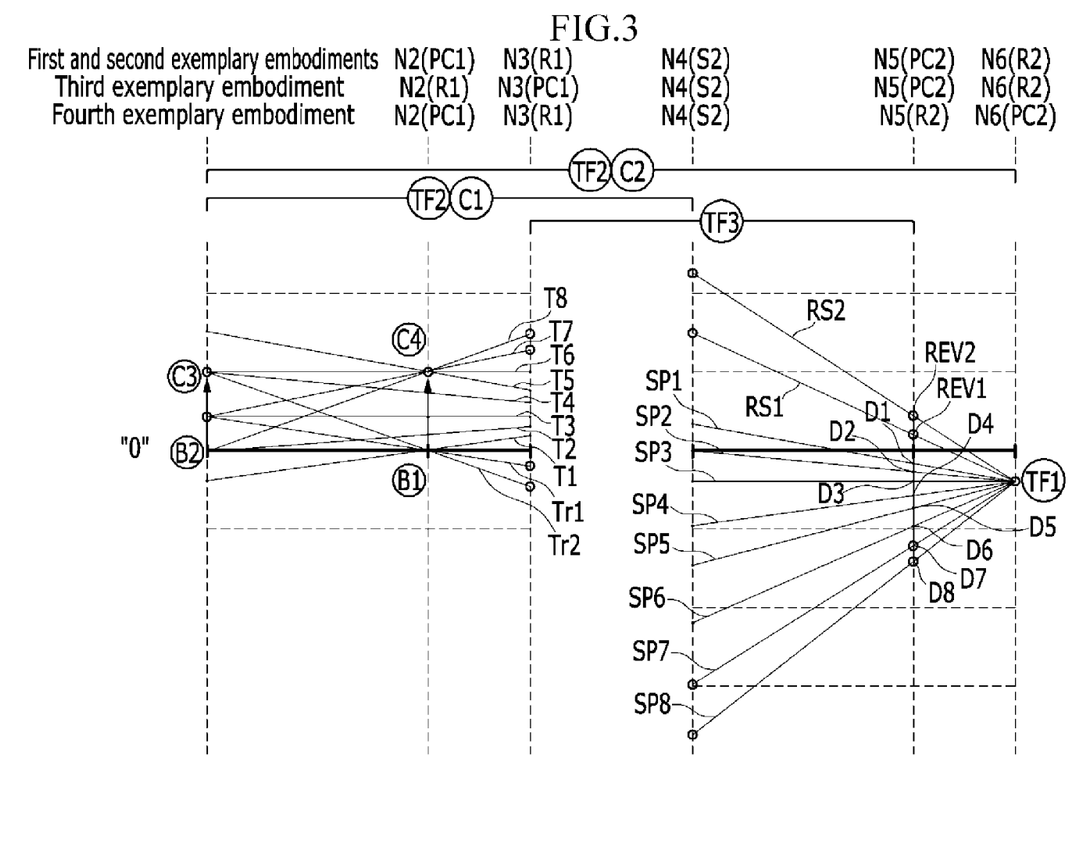
FIG. 3 is a lever diagram of a planetary gear train according to the planetary gear train of FIG. 1.

FIG. 3 is a lever diagram of the planetary gear train of FIG. 1, and illustrates shift processes of the planetary gear train by lever analysis method.

Referring to FIG. 3, three vertical lines of the first planetary gear set PG1 are set as the first, second, and third rotation elements N1, N2, and N3 from the left to the right, and three vertical lines of the second planetary gear set PG2 are set as the fourth, fifth, and sixth rotation elements N4, N5, and N6 from the left to the right.

A middle horizontal line represents a rotation speed of "0", upper horizontal lines represent positive rotation speeds and lower horizontal lines represent negative rotation speeds.

In addition, "−" in FIG. 3 means that rotational elements are rotated in an opposite direction to the rotation direction of the engine. It is because the first shaft IS1 and the first and second planetary gear sets PG1 and PG2 are externally meshed through the first, second, and third transfer gears TF1, TF2, and TF3 without an idling gear.

In addition, distances between the vertical lines of the first and second planetary gear sets PG1 and PG2 are set according to gear ratios (teeth number of a sun gear/teeth number of a ring gear).

Hereinafter, referring to FIG. 2 and FIG. 3, the shift processes of the planetary gear train according to various embodiments of the present invention will be described in detail.

First Forward Speed

Referring to FIG. 2, the first clutch C1 and the first brake B1 are operated at the first forward speed $1^{ST}$.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the first rotation element N1 is connected to the fourth rotation element N4 through the second transfer gear TF2 by operation of the first clutch C1.

In addition, the second rotation element N2 is operated as a fixed element by operation of the first brake B1.

Therefore, the rotation elements of the first planetary gear set PG1 form a first speed line T1, the rotation elements of the second planetary gear set PG2 form a first shift line SP1, and D1 is output through the fifth rotation element N5 that is an output element.

Second Forward Speed

The first brake B1 that was operated at the first forward speed $1^{ST}$ is released and the second brake B2 is operated at the second forward speed $2^{ND}$.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the first rotation element N1 is connected to the fourth rotation element N4 through the second transfer gear TF2 by operation of the first clutch C1.

In addition, the first rotation element N1 is operated as a fixed element by operation of the second brake B2.

Therefore, the rotation elements of the first planetary gear set PG1 form a second speed line T2, the rotation elements of the second planetary gear set PG2 form a second shift line SP2, and D2 is output through the fifth rotation element N5 that is the output element.

Third Forward Speed

The second brake B2 that was operated at the second forward speed $2^{ND}$ is released and the second clutch C2 is operated at the third forward speed $3^{RD}$.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the first rotation element N1 is connected to the fourth rotation element N4 through the second transfer gear TF2 by operation of the first clutch C1. In addition, the first rotation element N1 is connected to the sixth rotation element N6 through the second transfer gear TF2 by operation of the second clutch C2.

Therefore, the rotation elements of the first planetary gear set PG1 form a third speed line T3, the rotation elements of the second planetary gear set PG2 form a third shift line SP3, and D3 is output through the fifth rotation element N5 that is the output element.

Fourth Forward Speed

The second clutch C2 that was operated at the third forward speed $3^{RD}$ is released and the third clutch C3 is operated at the fourth forward speed $4^{TH}$.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the first rotation element N1 is connected to the fourth rotation element N4 through the second transfer gear TF2 by operation of the first clutch C1. In addition, the rotation speed of the first shaft IS1 is input to the first rotation element N1 by operation of the third clutch C3.

Therefore, the rotation elements of the first planetary gear set PG1 form a fourth speed line T4, the rotation elements of the second planetary gear set PG2 form a fourth shift line SP4, and D4 is output through the fifth rotation element N5 that is the output element.

Fifth Forward Speed

The third clutch C3 that was operated at the fourth forward speed $4^{TH}$ is released and the fourth clutch C4 is operated at the fifth forward speed $5^{TH}$.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the first rotation element N1 is connected to the fourth rotation element N4 through the second transfer gear TF2 by operation of the first clutch C1. In addition, the rotation speed of the first shaft IS1 is input to the second rotation element N2 by operation of the fourth clutch C4.

Therefore, the rotation elements of the first planetary gear set PG1 form a fifth speed line T5, the rotation elements of the second planetary gear set PG2 form a fifth shift line SP5, and D5 is output through the fifth rotation element N5 that is the output element.

Sixth Forward Speed

The first clutch C1 that was operated at the fifth forward speed $5^{TH}$ is released and the third clutch C3 is operated at the sixth forward speed $6^{TH}$.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the rotation speed of the first shaft IS1 is input to the second rotation element N2 by operation of the fourth clutch C4 and is input to the first rotation element N1 by operation of the third clutch C3.

Therefore, the rotation elements of the first planetary gear set PG1 form a sixth speed line T6, the rotation elements of the second planetary gear set PG2 form a sixth shift line SP6, and D6 is output through the fifth rotation element N5 that is the output element.

Seventh Forward Speed

The third clutch C3 that was operated at the sixth forward speed $6^{TH}$ is released and the second clutch C2 is operated at the seventh forward speed $7^{TH}$.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the rotation speed of the first shaft IS1 is input to the second rotation element N2 by operation of the fourth clutch C4. In addition, the first rotation element N1 is connected to the sixth rotation element N6 through the second transfer gear TF2 by operation of the second clutch C2.

Therefore, the rotation elements of the first planetary gear set PG1 form a seventh speed line T7, the rotation elements of the second planetary gear set PG2 form a seventh shift line SP7, and D7 is output through the fifth rotation element N5 that is the output element.

Eighth Forward Speed

The second clutch C2 that was operated at the seventh forward speed $7^{TH}$ is released and the second brake B2 is operated at the eighth forward speed $8^{TH}$.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the rotation speed of the first shaft IS1 is input to the second rotation element N2 by operation of the fourth clutch C4 and the first rotation element N1 is operated as a fixed element by operation of the second brake B2.

Therefore, the rotation elements of the first planetary gear set PG1 form an eighth speed line T8, the rotation elements of the second planetary gear set PG2 form an eighth shift line SP8, D8 is output through the fifth rotation element N5 that is the output element.

First Reverse Speed

As shown in FIG. 2, the second clutch C2 and the first brake B1 are operated at the first reverse speed REV1.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the rotation speed of the sixth rotation element N6 is converted according to the gear ratio of the second transfer gear TF2 and is then input to the first rotation element N1 by operation of the second clutch C2. In addition, the second rotation element N2 is operated as a fixed element by operation of the first brake B1.

Therefore, the rotation elements of the first planetary gear set PG1 form a first reverse speed line Tr1, the rotation elements of the second planetary gear set PG2 form a second reverse shift line RS1, and REV1 is output through the fifth rotation element N5 that is the output element.

Second Reverse Speed

As shown in FIG. 2, the third clutch C3 and the first brake B1 are operated at the second reverse speed REV2.

As shown in FIG. 3, the first shaft IS1 is directly connected to the sixth rotation element N6 through the first transfer gear TF1, and the third rotation element N3 is directly connected to the fifth rotation element N5 through the third transfer gear TF3.

In a state that a rotation speed of the first shaft IS1 is converted according to the gear ratio of the first transfer gear TF1 and is then input to the sixth rotation element N6, the rotation speed of the first shaft IS1 is input to the first rotation element N1 by operation of the third clutch C3 and the second rotation element N2 is operated as a fixed element by operation of the first brake B1.

Therefore, the rotation elements of the first planetary gear set PG1 form a second reverse speed line Tr2, the rotation elements of the second planetary gear set PG2 form a second reverse shift line RS2, and REV2 is output through the fifth rotation element N5 that is the output element.

As described above, the planetary gear train of FIG. 1 can achieve eight forward speeds and two reverse speeds by combining two planetary gear sets PG1 and PG2 being the simple planetary gear sets, three transfer gears TF1, TF2, and TF3 being the externally-meshed gears and six frictional elements C1, C2, C3, C4, B1, and B2.

In addition, optimum gear ratios may be set due to ease of changing gear ratios by using three transfer gears being externally-meshed gears as well as the planetary gear sets. Since gear ratios can be changed according to target performance, starting performance, power delivery performance and fuel economy may be improved. Therefore, a start-up clutch instead of a torque converter may be used.

In addition, two friction elements are operated at each shift-speed and one friction element is released and another friction element is operated so as to shift to a neighboring shift-speed. Therefore, shift control condition is fully satisfied.

Figure 4:
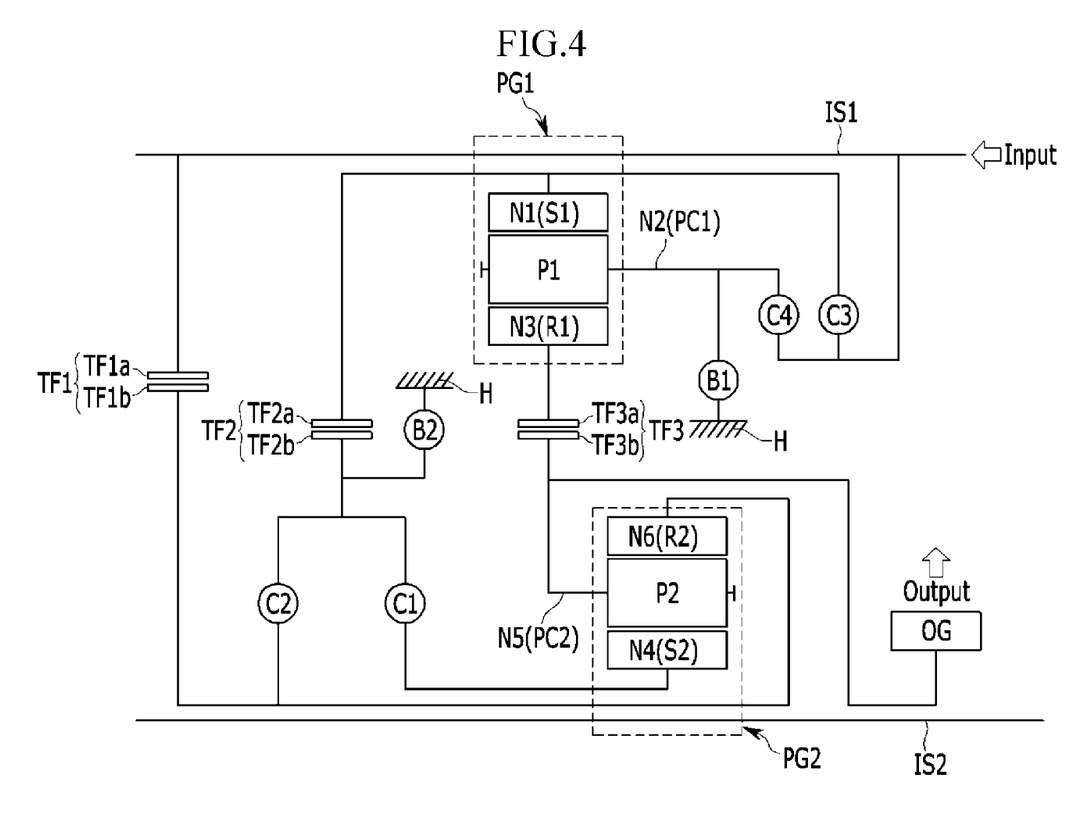
FIG. 4 is a schematic diagram of an exemplary planetary gear train according to the present invention.

FIG. 4 is a schematic diagram of a planetary gear train according to various embodiments of the present invention.

Referring to FIG. 4, the second brake B2 is disposed between the first rotation element N1 and the transmission housing H in the planetary gear train of FIG. 1, but the second brake B2 is disposed between the second transfer driven gear TF2b and the transmission housing H in the planetary gear train of FIG. 4.

Since functions of the planetary gear train of FIG. 4 are the same as those of the planetary gear train of FIG. 1 except the position of the second brake B2, detailed description thereof will be omitted.

Figure 5:
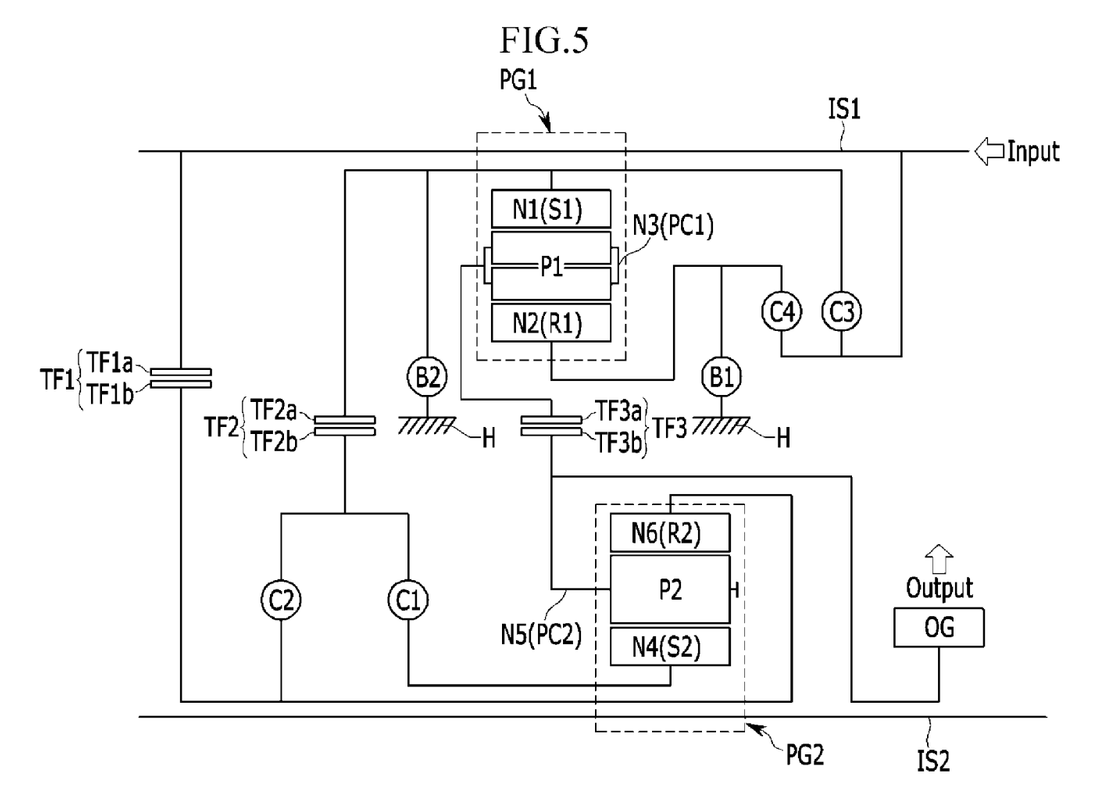
FIG. 5 is a schematic diagram of an exemplary planetary gear train according to the present invention.

FIG. 5 is a schematic diagram of a planetary gear train according to various embodiments of the present invention.

Referring to FIG. 5, the first planetary gear set PG1 is the single pinion planetary gear set in the planetary gear train of FIG. 1, but the first planetary gear set PG1 is a double pinion planetary gear set in the planetary gear train of FIG. 5.

Therefore, the second rotation element N2 is changed from the first planet carrier PC1 to the first ring gear R1, and the third rotation element N3 is changed from the first ring gear R1 to the first planet carrier PC1.

Since functions of the planetary gear train of FIG. 5 are the same as those of the planetary gear train of FIG. 1 except the rotation elements consisting of the second and third rotation elements N2 and N3, detailed description thereof will be omitted.

Figure 6:
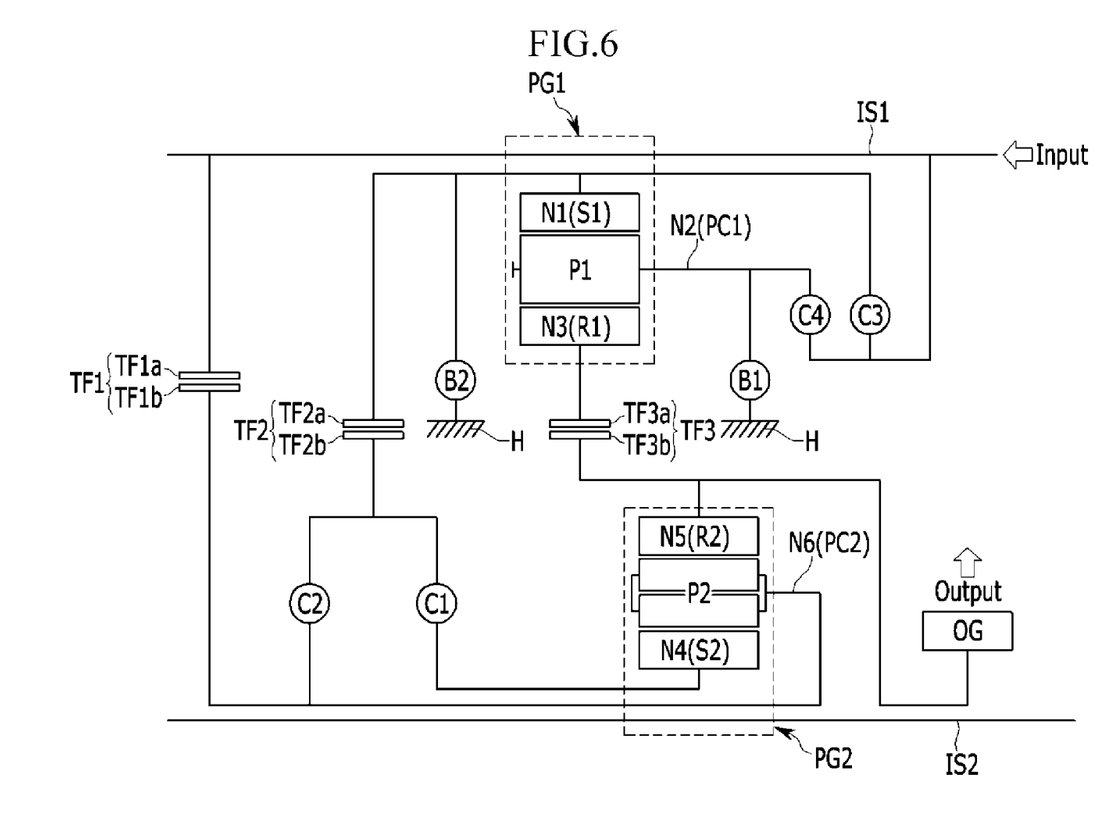
FIG. 6 is a schematic diagram of an exemplary planetary gear train according to the present invention.

FIG. 6 is a schematic diagram of a planetary gear train according to various embodiments of the present invention.

Referring to FIG. 6, the second planetary gear set PG2 is the single pinion planetary gear set in the planetary gear train of FIG. 1, but the second planetary gear set PG2 is a double pinion planetary gear set in the planetary gear train of FIG. 6.

Therefore, the fifth rotation element N5 is changed from the second planet carrier PC2 to the second ring gear R2, and the sixth rotation element N6 is changed from the second ring gear R2 to the second planet carrier PC2.

Since functions of the planetary gear train of FIG. 6 are the same as those of the planetary gear train of FIG. 1 except the rotation elements consisting of the fifth and sixth rotation elements N5 and N6, detailed description thereof will be omitted.

Meanwhile, it is illustrated, but is not limited, in the drawings that the second shaft IS2 merely supports the second planetary gear set PG2 without rotational interference therebetween. That is, the second shaft IS2 may be used as an output shaft by directly connecting the fifth rotation element N5 being the output element and the output gear OG to the second shaft IS2.

In addition, the second shaft IS2 may be used as a connecting member connecting the sixth rotation element N6 to the first and second transfer gears TF1 and TF2.

Eight forward speeds and two reverse speeds can be achieved by combining two planetary gear set being the simple planetary gear sets, three transfer gears and six frictional elements.

In addition, since two planetary gear sets are disposed separately on the first shaft and the second shaft disposed in parallel with a predetermined distance, a length thereof may be reduced and mountability may be improved.

In addition, optimum gear ratios may be set due to ease of changing gear ratios by using three external-meshing gears as well as the planetary gear sets. Since gear ratios can be changed according to target performance, starting performance, power delivery performance, and fuel economy may be improved. Therefore, a start-up clutch instead of a torque converter may be used.

In addition, two friction elements are operated at each shift-speed, and one friction element is released and another friction element is operated so as to shift to a neighboring shift-speed. Therefore, shift control condition is fully satisfied.

For convenience in explanation and accurate definition in the appended claims, the terms upper or lower, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    a first shaft receiving engine torque;
    a second shaft disposed in parallel with the first shaft at a predetermined distance;
    a first planetary gear set disposed on the first shaft, and including a first rotation element selectively connected to the first shaft and a transmission housing, a second rotation element selectively connected to the first shaft and selectively connected to the transmission housing, and a third rotation element;
    a second planetary gear set disposed on the second shaft, and including a fourth rotation element selectively connected to the first rotation element, a fifth rotation element connected to the third rotation element and directly connected to an output gear, and a sixth rotation element always connected to the first shaft and selectively connected to the first rotation element;
    a first transfer gear connecting the first shaft to the sixth rotation element, wherein the first transfer gear includes a first transfer drive gear and a first transfer driven gear;
    a second transfer gear connecting the first rotation element to the fourth rotation element and the sixth rotation element, wherein the second transfer gear includes a second transfer drive gear and a second transfer driven gear;
    a third transfer gear connecting the third rotation element to the fifth rotation element, wherein the third transfer gear includes a third transfer drive gear and a third transfer driven gear; and
    frictional elements including clutches and brakes including:
        a first clutch selectively or operatively connects the first rotation element to the fourth rotation element;
        a second clutch selectively or operatively connects the first rotation element to the sixth rotation element;
        a third clutch selectively or operatively connects the first rotation element to the first shaft;
        a fourth clutch selectively or operatively connects the second rotation element to the first shaft;
        a first brake selectively or operatively connects the first rotation element to the transmission housing; and
        a second brake selectively or operatively connects the second rotation element to the transmission housing; and
    wherein the second rotation element of the first planetary gear set is not directly connected to any of the fourth, fifth and sixth rotation elements of the second planetary gear set through the first, second or third transfer gear.

2. The planetary gear train of claim 1, wherein the first planetary gear set is a double pinion planetary gear set including a first sun gear being the first rotation element, a first ring gear being the second rotation element, and a first planet carrier being the third rotation element, and
    the second planetary gear set is a single pinion planetary gear set including a second sun gear being the fourth rotation element, a second planet carrier being the fifth rotation element, and a second ring gear being the sixth rotation element.

3. The planetary gear train of claim 1, wherein the first planetary gear set is a single pinion planetary gear set including a first sun gear being the first rotation element, a first planet carrier being the second rotation element, and a first ring gear being the third rotation element, and the second planetary gear set is a double pinion planetary gear set including a second sun gear being the fourth rotation element, a second ring gear being the fifth rotation element, and a second planet carrier being the sixth rotation element.

4. The planetary gear train of claim 1, wherein the first planetary gear set is a single pinion planetary gear set including a first sun gear being the first rotation element, a first planet carrier being the second rotation element, and a first ring gear being the third rotation element, and the second planetary gear set is a single pinion planetary gear set including a second sun gear being the fourth rotation element, a second planet carrier being the fifth rotation element, and a second ring gear being the sixth rotation element.

5. The planetary gear train of claim 4, wherein the frictional elements comprise:

the first clutch disposed between the second transfer gear and the fourth rotation element;

the second clutch disposed between the second transfer gear and the sixth rotation element;

the third clutch disposed between the first shaft and the first rotation element;

the fourth clutch disposed between the first shaft and the second rotation element;

the first brake disposed between the second rotation element and the transmission housing; and the second brake disposed between the first rotation element and the transmission housing.

6. The planetary gear train of claim 4, wherein the frictional elements comprise:

the first clutch disposed between the second transfer gear and the fourth rotation element;

the second clutch disposed between the second transfer gear and the sixth rotation element;

the third clutch disposed between the first shaft and the first rotation element;

the fourth clutch disposed between the first shaft and the second rotation element;

the first brake disposed between the second rotation element and the transmission housing; and the second brake disposed between the second transfer gear and the transmission housing.

* * * * *